(12) United States Patent
Berstis

(10) Patent No.: US 6,754,697 B1
(45) Date of Patent: Jun. 22, 2004

(54) METHOD AND APPARATUS FOR BROWSING AND STORING DATA IN A DISTRIBUTED DATA PROCESSING SYSTEM

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 09/108,148

(22) Filed: Jun. 30, 1998

(51) Int. Cl.$^7$ .............................................. G06F 15/16
(52) U.S. Cl. ...................... 709/217; 709/225; 709/229; 707/2; 707/10; 710/61; 340/825
(58) Field of Search ................................. 709/202, 217, 709/225, 229, 232, 305; 340/825; 710/61; 707/2, 10

(56) References Cited

U.S. PATENT DOCUMENTS

| | | | | |
|---|---|---|---|---|
| 5,231,578 A | * | 7/1993 | Levin et al. | |
| 5,581,682 A | * | 12/1996 | Anderson et al. | |
| 5,625,833 A | * | 4/1997 | Levine et al. | |
| 5,663,748 A | * | 9/1997 | Huffman et al. | |
| 5,680,636 A | * | 10/1997 | Levine et al. | |
| 5,737,619 A | * | 4/1998 | Judson | |
| 5,764,902 A | * | 6/1998 | Rothrock | |
| 5,826,025 A | * | 10/1998 | Gramlich | 709/217 |
| 5,877,759 A | * | 3/1999 | Bauer | |
| 5,890,164 A | * | 3/1999 | Nielsen | |
| 5,907,322 A | * | 5/1999 | Kelly et al. | |
| 5,907,681 A | * | 5/1999 | Bates et al. | |
| 5,917,491 A | * | 6/1999 | Bauersfeld | |
| 5,918,237 A | * | 6/1999 | Montalbano | |
| 5,926,631 A | * | 7/1999 | McGarvey | |
| 5,931,907 A | * | 8/1999 | Davies et al. | |
| 5,961,602 A | * | 10/1999 | Thompson et al. | 709/229 |
| 6,002,402 A | * | 12/1999 | Schacher | |
| 6,006,227 A | * | 12/1999 | Freeman et al. | |
| 6,009,429 A | * | 12/1999 | Greer et al. | 707/10 |
| 6,012,090 A | * | 1/2000 | Chung et al. | |
| 6,023,701 A | * | 2/2000 | Malik et al. | 707/10 |
| 6,037,934 A | * | 3/2000 | Himmel et al. | |
| 6,041,360 A | * | 3/2000 | Himmel et al. | |
| 6,049,812 A | * | 4/2000 | Bertram et al. | |
| 6,081,829 A | * | 6/2000 | Sidana | |
| 6,182,113 B1 | * | 1/2001 | Narayanaswami | |
| 6,211,871 B1 | * | 4/2001 | Himmel et al. | 709/217 |

* cited by examiner

*Primary Examiner*—Rupal Dharia
*Assistant Examiner*—Stephan Willett
(74) *Attorney, Agent, or Firm*—Duke W. Yee; Jeffrey S. LaBaw; Stephen J. Walder, Jr.

(57) ABSTRACT

A method and system for browsing a distributed database. Storage is allocated in a computer for a file, wherein the file is used for storing references to data in the distributed database for retrieval at a later time. A reference to data in the distributed database is added to the file in response to a user input from a user using the computer to browse the distributed database. The data is retrieved from the distributed database using references to the data stored within the file in response to a selected event.

33 Claims, 5 Drawing Sheets

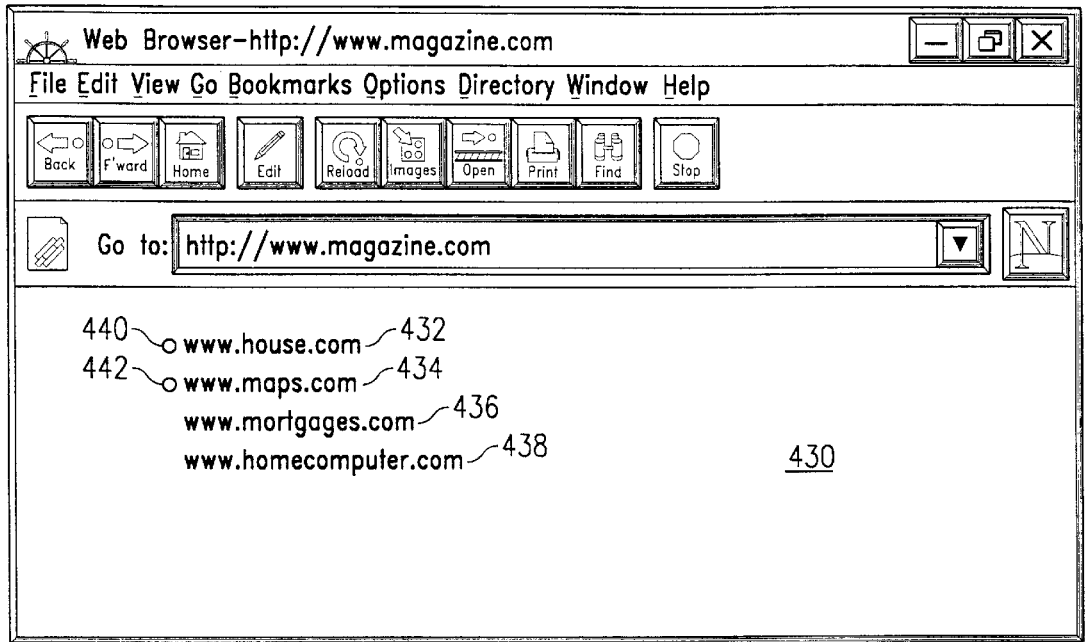
FIG. 4D
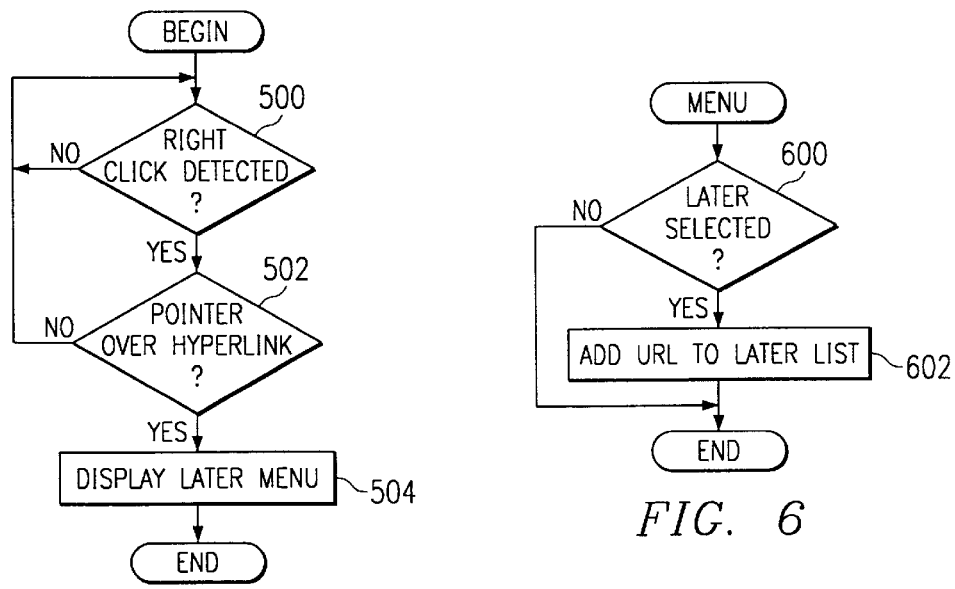
FIG. 5
FIG. 6

METHOD AND APPARATUS FOR BROWSING AND STORING DATA IN A DISTRIBUTED DATA PROCESSING SYSTEM

BACKGROUND OF THE INVENTION

1. Technical Field

The present invention relates generally to an improved data processing system and in particular to an improved method and apparatus for accessing data on a distributed database within a distributed data processing system. Still more particularly, the present invention relates to a method and apparatus for storing references to selected web pages within a distributed data processing system.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this. information by the web "browser". A browser is a program capable of submitting a request for information identified by a URL at the client machine. Retrieval of information on the web is generally accomplished with an HTML-compatible browser.

When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with work stations are typically used to access the Internet.

A number of users employ the Internet to access information using links displayed on a page in the browser. The method of searching for information on the Internet is referred to as "surfing" or "browsing". Internet browsing can be distracting because a user may be searching for a particular piece of information and become distracted by other interesting links, such as advertisements or articles. By the user becoming distracted by other articles while browsing, the user may forget the original information being searched or may spend too much time following interesting links other than those leading to the desired information. Alternatively, if the user remains concentrated on the user's tasks, the user may lose the interesting links. For example, the page may no longer be found in back/forward list, or the user may forget on what page the link occurred.

Therefore, it would be advantageous to have an improved method and apparatus for searching the Internet.

SUMMARY OF THE INVENTION

It is one object of the present invention to provide an improved data processing system.

It is another object of the present invention to provide an improved method and apparatus for accessing data on a distributed database within a distributed data processing system.

It is yet another object of the present invention to provide a method and apparatus for storing references to selected web pages within a distributed data processing system.

The present invention provides a method and system for browsing a distributed database. Storage is allocated in a computer for a file, wherein the file is used for storing references to data in the distributed database for retrieval at a later time. A reference to data in the distributed database is added to the file in response to a user input from a user using the computer to browse the distributed database. The data is retrieved from the distributed database using references to the data stored within the file in response to a selected event.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A–4D are pictorial diagrams of processes used to save references to links in web pages in accordance with a preferred embodiment of the present invention;

FIG. 5 is a flowchart of a process displaying a pop-up menu that is used storing references to a list in accordance with a preferred embodiment of the present invention;

FIG. 6 is a flowchart of a process employing the "later" function to save a reference to a document on a distributed database in accordance with a preferred embodiment of the present invention;

DETAILED DESCRIPTION OF THE PREFERRED EMBODIMENT

Figure 1:
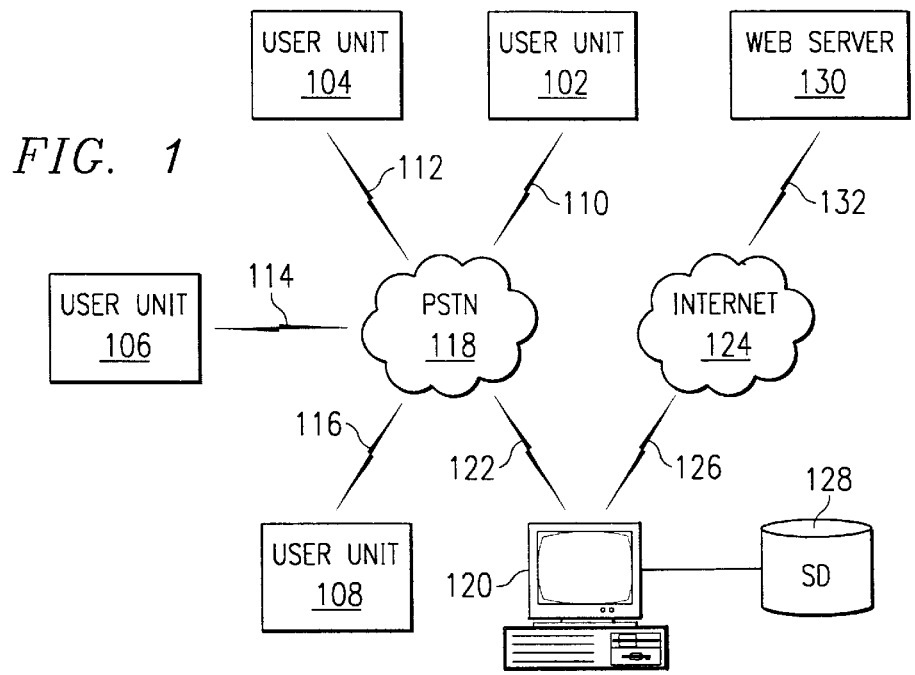
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted. User units 102, 104, 106 and 108 have communications links 110, 112, 114 and 116, which provide these user units access to public switched telephone network (PSTN) 118. Through these communications links, the user units communicate with server 120, which is connected to PSTN 118 by communications link 122. Server 120 provides user units 102–108 access to a distributed database, such as, for example, Internet 124 via communications link 126. In addition to providing user units 102–108 access to Internet 124, server 120 also stores various configuration information, passwords, E-mail messages, and backup data on storage device (SD) 128. Server 120 also may serve as a web server, also referred to as a "source data processing system" containing one or more web sites. User unites 102–108 may be located in remote geographical locations, such as California or New York. Additionally, user units 102–108 may be located on other continents on the globe. Internet 124 includes a number of web sites that may be accessed by user units 102–108. These web sites are stored on source data processing systems located on Internet 124, also referred to as "web servers", such as web server 130. Web server 130 communicates with other data processing system (not shown) on Internet 124 via communications link 132. User units 102–108 access web sites stored on web server 130 by receiving web pages from web server 130.

Figure 2:
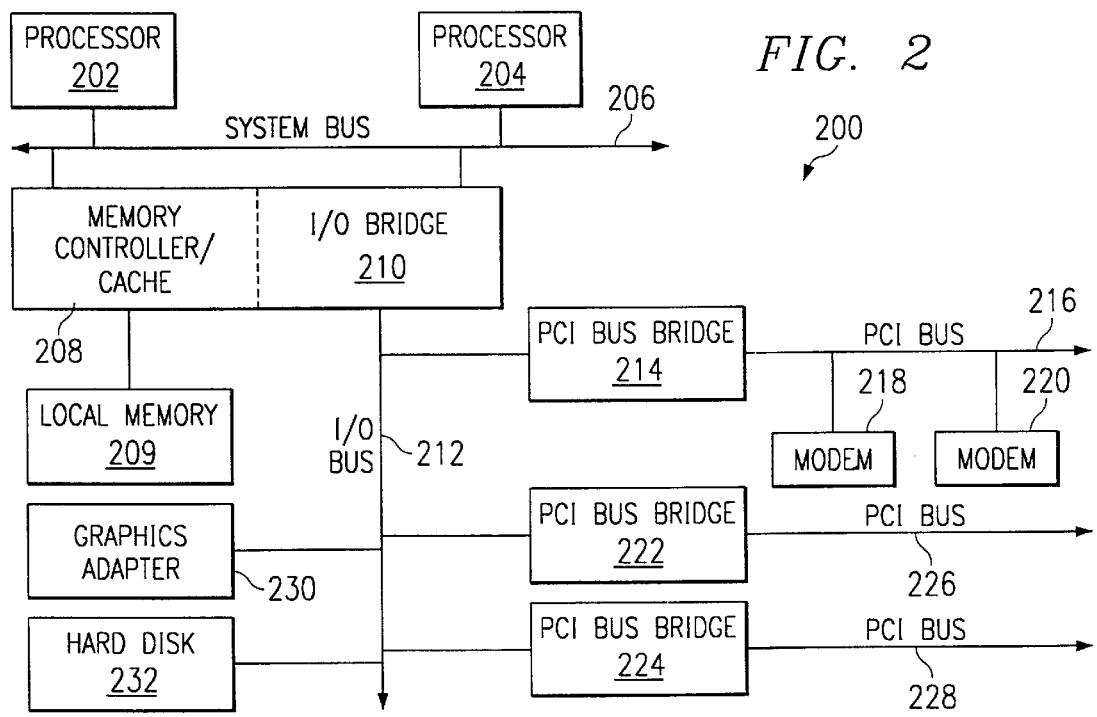
FIG. 2 is a block diagram of a data processing system which may be implemented as a web server in accordance to the present invention.

Referring to FIG. 2, a block diagram of a data processing system which may be implemented as a web server, such as web server 130 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI bus 216. A number of modems 218–220 may be connected to PCI bus 216. Typical PCI bus implementations will support four PCI expansion slots or add-in connectors. Communications links to PSTN 118 depicted in FIG. 1 may be provided through modems 218–220 connected to PCI local bus 216 through add-in boards. Modems 218–220 in the depicted example also provides a connection to Internet 124 shown in FIG. 1.

Additional PCI bus bridges 222 and 224 provide interfaces for additional PCI buses 226 and 228, from which additional modems may be supported. In this manner, server 200 allows dialups by multiple user units simultaneously. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system. The data processing system provides a platform for a web server, and may be one of a group of interconnected servers employed by an Internet service provider to provide access to web clients or user units to the Internet.

The server data processing system in accordance with a preferred embodiment of the present invention includes a web server program, such as Netscape Enterprise Server Version 2.0, a product of Communications Corporation in Mountain View, Calif., which supports interface extensions. The server thus contains a known set of server application functions (SAFs) which accept a client's request together with configuration information and return a response. The server may also include an Application Programming Interface (API) providing extensions that enable application developers to extend or customize the SAFs through software programs commonly known as "plug-ins".

Figure 3:
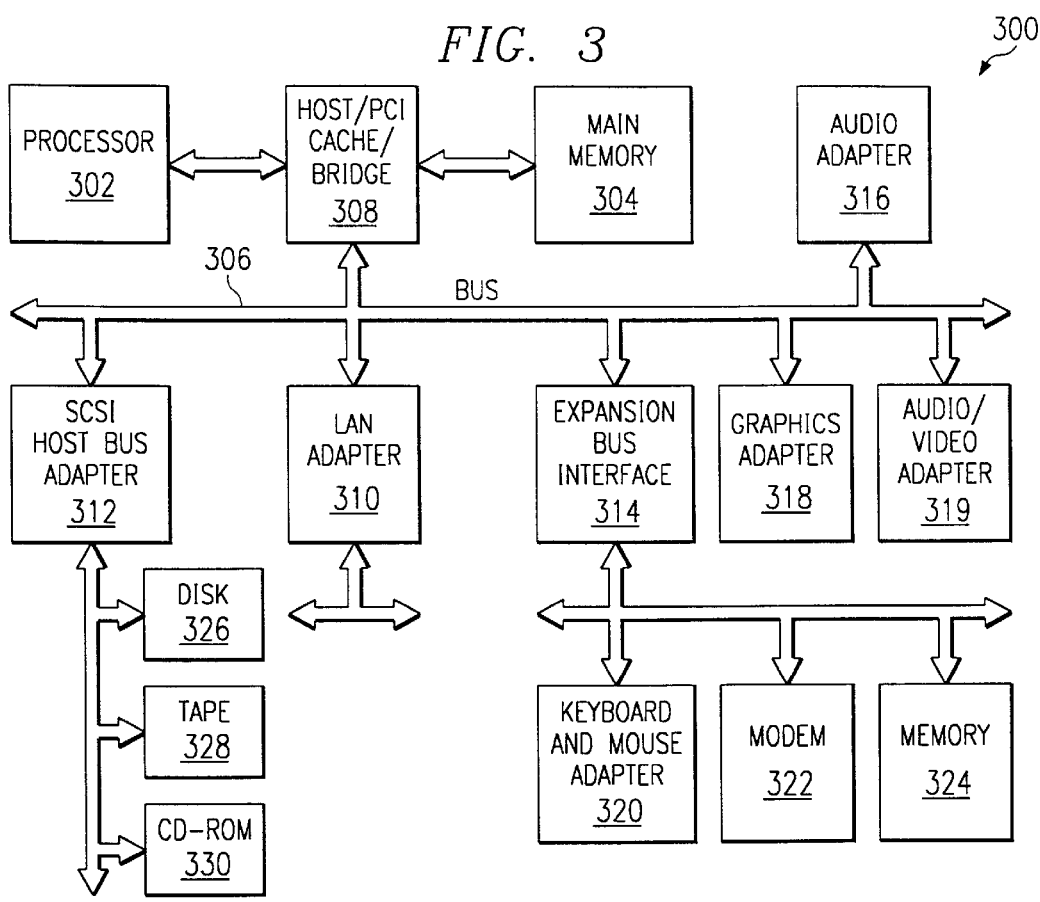
FIG. 3 is a block diagram of a data processing system which may be implemented as a user unit in accordance with a preferred embodiment of the present invention.

With reference now to FIG. 3, a block diagram of a data processing system 300 which may be implemented as a user unit is illustrated in accordance with a preferred embodiment of the present invention. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. Those of ordinary skill in the art will appreciate that the hardware in FIG. 3 may vary. For example, other peripheral devices, such as optical disk drives and the like may be used in addition to or in place of the hardware depicted in FIG. 3. The depicted example is not meant to imply architectural limitations with respect to the present invention.

Web pages, or hypertext documents, are retrieved through references to the location of these pages or documents.

Uniform Resource Locators (URLs) are the references identifying the communications source for the page. The URL is typically of the form "www.domainname.ext/filepath/filename". The domain name and extension identify a specific web site (web domain or server) containing the requested information. The requested information will comprise a file or a group of files organized within directories on the web site which is the subject of the request. Thus, the URL must include a path to the files containing the information requested and may also require a filename. No extension need to be specified for the filename since only HTML files are displayed by the browser and a default extension of ".html" or ".htm" is assumed. If no filename is specified in the request, the browser searches for an HTML file named "default" or "index" at the specified web domain and path.

URLs may be selected from a displayed web page by selection of a hyperlink, also called a "link". The selection of this link results in the URL being followed. The link is often in the form of text that will serve as a "hot spot", which allows a user to follow the link. The "hot spot" is indicated in various ways, such as, for example, by highlighting text on the web page or change the display of a pointer over the hot spot.

Figure 4A:
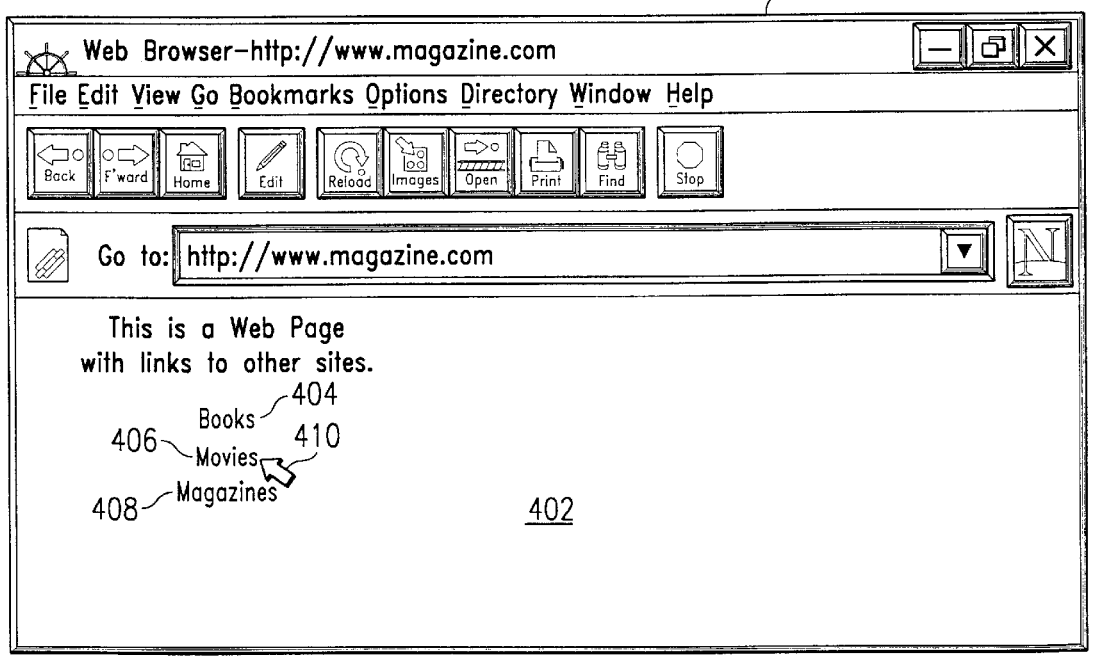

Turning now to FIGS. 4A-4D, pictorial diagrams of processes used to save references to links in web pages are depicted in accordance with a preferred embodiment of the present invention. In FIG. 4A, a browser 400 is illustrated in which a web page 402 is displayed within browser 400. Browser 400 in the depicted example may be Netscape Communicator, which is available from Netscape Communications Corporation. Web page 402 includes links 404, 406, and 408 which may be selected via pointer 410, which is controlled by a pointing device, such as a mouse or track ball.

Figure 4B:
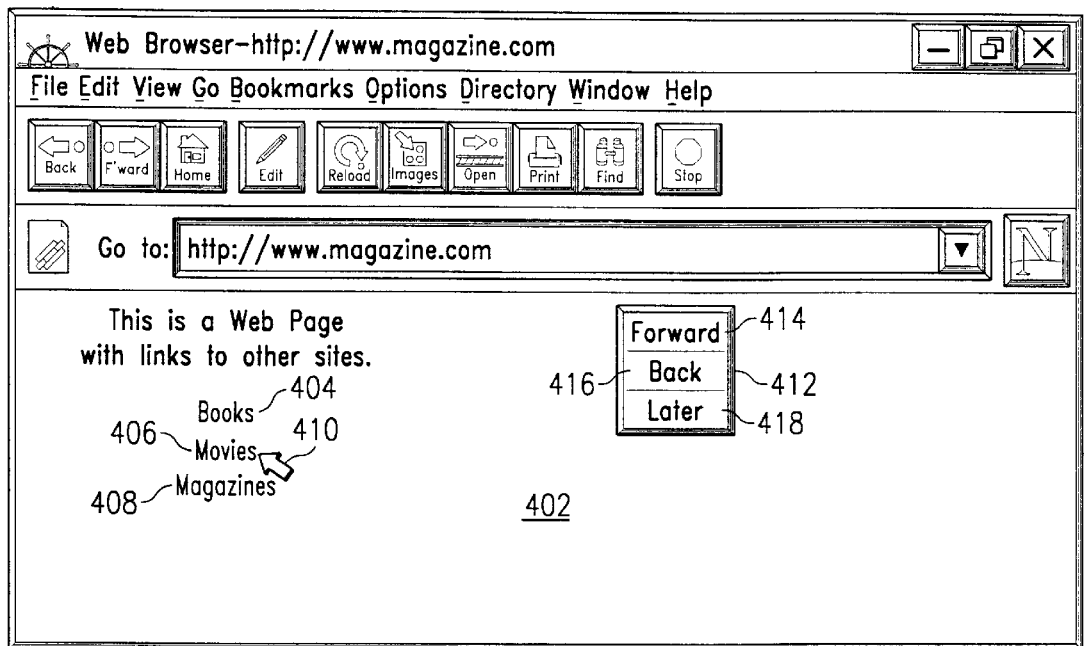

According to the present invention, if the user is searching for a selected piece of information and finds an unrelated link of interest, the user may save this URL for later viewing. The saving of the URL is accomplished in the depicted example by the pointer being located over the link and a selected input being made to indicate that the URL for the link should be saved. For example, if the user is searching for information on vacation sites and sees link 406, which relates to movies, the user may move pointer 410 over link 406 and depress the right mouse button, which is referred to as a "right click", to cause menu 412 to be displayed, as illustrated in FIG. 4B. Although the depicted example employs a right click of the mouse as input to initiate saving of the URL, other types of inputs may be used. For example, a function key may be depressed or in the case of a mouse with three buttons, the middle button may be depressed.

In the depicted example, menu 412 includes a "forward" command 414 and a "back" command 416, which are used to traverse web pages already retrieved by the user. In addition, menu 412 includes a "later" command 418, which when selected by the user, saves the URL of the link indicated by the user through pointing device 410. In this example, menu 412 includes "later" command 418 only when pointer 410 is located over a link. When a URL is stored, it is placed in a file or list for later review by the user. This list is referred to as the "later" list. The URL along with other identifying information is stored as an entry in the later list. Other information that may be stored with the URL in an entry to identify the link to a user, includes, for example, text from the original link, image of the link, information about the page originally containing the link, and the date or time the link was placed on the later list. After the page has been retrieved, the title of the page may be stored in the later list for use as an indication to the user that the page has been retrieved.

In addition, the processes of the present invention also may retrieve the information referenced to by the URLs stored in the later list. The retrieval of information may occur at various times. The information is retrieved and stored in the browser cache and not displayed until the user selects it for display at a later time. For example, information may be retrieved when an absence of activity is present on the user's data processing system. Alternatively, information may be retrieved during preselected times, such as at night or early in the morning.

Figure 4C:
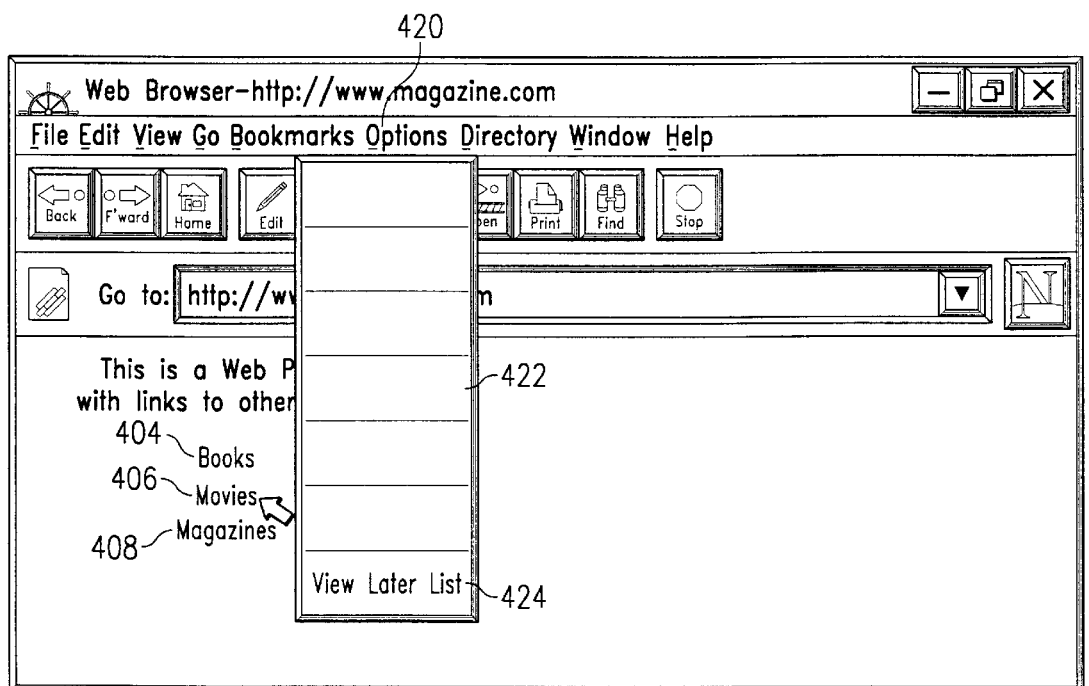

In FIG. 4C, the user has selected "options" 420, which results in menu 422 being displayed in browser 400. Within menu 422, a "view later list" command 424 is presented to the user so that the user may review or browse the links previously stored. When view later list command 424 is selected, the list of URLs is displayed as a page 430 in FIG. 4D to the user on browser 400. The depicted example includes four entries 432, 434, 436, and 438. Information for some of the entries have been retrieved while information has not been retrieved for other entries. The difference between these types of entries are graphically indicated in the depicted example by circles 440 and 442, which are associated with links 432 and 434 to indicate that information has been retrieved for those links. In addition, the title of a retrieved page also could be used to indicate that information has been retrieved for a link. Of course other types of indications may be used to show that information has been retrieved. For example, the text of the URLs may be highlighted or other graphical indicators may be used. In addition, other examples of indications may include: the title, text from the original link, image of the link, information about the page originally containing the link, and the date or time the link was placed on the later list. After the page has been retrieved, the title of the page may be used as an indication that the page has been retrieved.

Turning next to FIG. 5, a flowchart of a process displaying a pop-up menu that is used for storing references to a list is depicted in accordance with a preferred embodiment of the present invention. The process begins in FIG. 5 with a determination as to whether the user has depressed the right click button on the mouse to display a pop-up menu (step 500). Of course other input may be used other than a right click by depressing the right mouse button. For example, the user may use a function key, a control+key input. If the user has not depressed the right button on the mouse to display a pop-up menu, the process returns to step 500.

If the user has depressed the right mouse button, a determination is made as to whether the pointer is located over a link when the right mouse button was depressed (step 502). If the pointer is not located over a link, the process returns to step 500. At this point, no steps are taken to display a menu including a later list command. Instead, the normal menu or actions normally taken by the browser occur. If the pointer is located over the link, a menu is displayed (step 504). In the depicted example, three functions are illustrated. These functions would include a "back" function, a "forward" function, and a "later" function. The "back" function and the "forward" function are presently available functions in most browsers for traversing pages already viewed by the user. The later function is the function that causes the URL for a link to be saved to a list for later viewing or retrieval.

With reference now to FIG. 6, a flowchart of a process employing the "later" function to save a reference to a document on a distributed database is depicted in accordance with a preferred embodiment of the present invention. FIG. 6 begins with the process by determining whether the "later" function has been selected (step 600). If the "later" function is not selected, the process terminates. If the "later" function is selected, the process continues by adding or storing the URL selected by the pointer to a later list to be retrieved by the user at a later time (step 602). Additionally, in step 602, other information also may be added to the later list for this entry, such as, for example, identification of the page containing the link, an image of the page containing the link, the image of the link, text of the link, and the time the entry was added to the later list.

Figure 7:
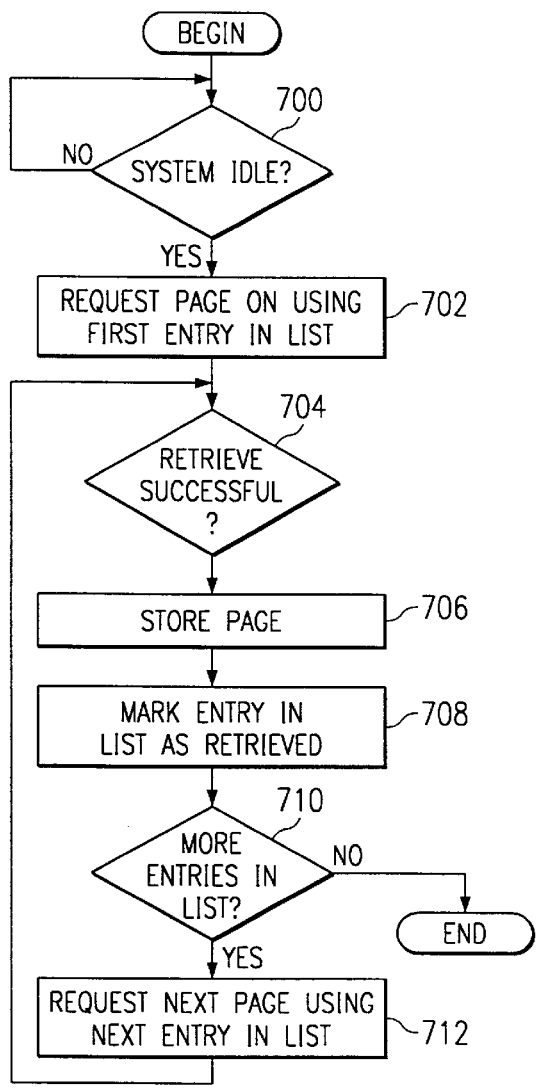
FIG. 7 is a flowchart of a process for retrieving information from a list of references in accordance with a preferred embodiment.

Turning now to FIG. 7, a flowchart of a process for retrieving information using a list of references is depicted in accordance with a preferred embodiment. A determination is made as to whether the data processing system is at an idle state (step 700). In the depicted example, the data processing system is idle when the user is not activating functions in the web browser. If the data processing system is not idle, the process returns to step 700. The term "idle" may be defined in the depicted example to mean that no input activity or network data transfer has occurred for more than a selected period of time. Other types of idle also may be employed depending upon the design of the browser, server preferences, or user preferences. For example, idle may be the time when the server is idle, rather than when the user system is idle or simply that the user system has excess capacity. For example, on instance in which excess capacity may occur is when the data processing system is able to retrieve pages without a user noticing that performance of foreground tasks has slowed down. Otherwise, the data processing system will request a document or web page from the distributed database (i.e., the Internet) referenced by the first URL stored on the list (step 702). Then a determination is made as to whether the requested page has been successfully retrieved (step 704).

If the retrieval of the page is successful, the page is stored in a cache (step 706). In the depicted example, the cache is the same cache employed by the web browser to store retrieved pages through normal browsing of the distributed database. The entry in the later list is then marked as retrieved (step 708). Optionally, in step 708, the title of the target URL may be added to the later list retrieved. This marking of entries is used to identify entries as having information retrieved when the list is present to the user. Thereafter, a determination is made as to whether additional entries are present on the list (step 710). If more entries are present on the list, the page for the next entry on the list is requested from the distributed database (step 712). With reference again to step 704, if the retrieval of the page is not successful, the process then proceeds to step 710 as previously described. In step 710, if additional entries are not present on the list, the process will then terminate.

Figure 8:
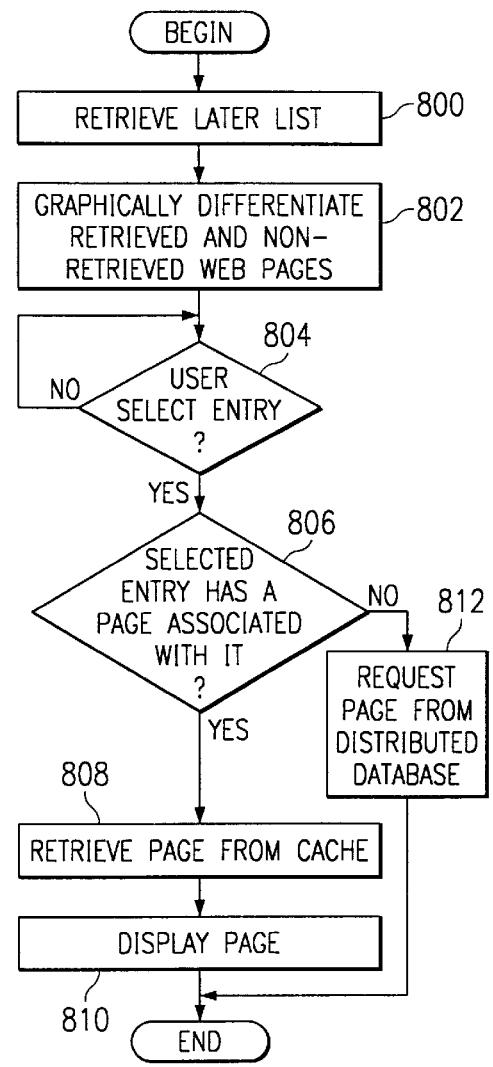
FIG. 8 is a flowchart of a process for displaying entries in a list of references in accordance with a preferred embodiment of the present invention.

With reference now to FIG. 8, a flowchart of a process for displaying entries in a list of URLs in accordance with a preferred embodiment of the present invention. In displaying the list, the process differentiates between retrieved and non-retrieved web pages. The process begins by retrieving the list (step 800). The entries in the list are displayed graphically or with graphical indications to differentiate between retrieved and non-retrieved pages (step 802). These graphical indications may include, for example, highlighting text, changing color of the text, or associating a graphical indicator with entries for which pages have been retrieved.

A determination is then made as to whether the user has selected an entry (step 804). If the user has not selected an entry, the process returns to step 804. Otherwise, a determination is made as to whether the selected entry has a page associated with it stored in the cache (step 806). If a page has been previously retrieved for the entry, the page is retrieved from the cache (step 808), and the page is then displayed to the user (step 810) with the process terminating thereafter.

With reference again to step 806, if a page has not been retrieved for the entry, that page is then requested from the distributed database (step 812) with the process terminating thereafter.

The graphical differentiation of entries on the displayed list allows a user to quickly determine if a URL is worthwhile. If the user determines that the URL is worthwhile, the user may select that entry without waiting for the actual download if the pages have already been retrieved using the processes of the present invention.

Thus, the present invention provides an improved method and apparatus for browsing information on a distributed database, such as the Internet. This advantage is provided by a process, which allows a user to save references to pages in a list for later review. In this manner, the user may pursue the information initially searched for while saving references to information that is interesting, but not the topic of the search. The present invention may retrieve pages for the references during periods of time in which the browser or system is idle.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for browsing a distributed database comprising the computer implemented steps of:

allocating storage in a computer for a file, wherein the file is used for storing references to a set of files distributed database for retrieval at a later time;

adding a reference to a first file within the set of files in the distributed database to the file in which the reference is displayed on the computer within a second file in the distributed database in response to a user input, selecting the reference without retrieving the first file, from a user using the computer to browse the distributed database.

2. The method of claim 1 further comprising:

retrieving the set of files from the distributed database using reference to the set of files stored within the file in response to a selected event, wherein the set of files is retrieved for viewing by the user at a later time.

3. The method of claim 1, wherein the distributed database is the Internet.

4. The method of claim 1, wherein the file is a list of references.

5. The method of the claim 2 further comprising:
   storing the set of files locally within the computer, wherein the set of files is available when desired by the user.

6. The method of claim 2, wherein the selected event is a period of time in which user input to the computer is absent.

7. The method of claim 2, wherein the selected event is a time during which activity on the computer is lowest.

8. The method of claim 5, wherein the selected event is excess capacity in the computer.

9. The method of claim 5, wherein file reference by a first number of references within the file is present and files reference by a second number of references within the file is absent and further comprising displaying the file to the user by:
   displaying the first number of references in a first format; and
   displaying the second number of references in a second format, wherein references with files can be distinguished from references without files by the user.

10. The method of claim 9 further comprising:
    retrieving the first file for the reference from the computer and displaying the first file in response to a selection of the reference from the first number of references.

11. The method of claim 9 further comprising:
    retrieving the first file for the reference from the distributed database in response to a selection of the reference from the second number of references.

12. A method in a browser program used on a computer for browsing a distributed database, the method comprising:
    displaying a document containing links, wherein each link represents a reference to a document on the distributed database;
    storing a reference to a document in a file in response to a selection of a link associated with the document by the user; and
    retrieving references in the file in response to a preselected event, wherein the data is retrieved for viewing by the user at a later time.

13. The method of claim 12 further comprising:
    displaying the file to the user in response to the user requesting the file at the later time.

14. The method of claim 13, wherein documents referenced by a first number of references with the file is present and documents referenced by a second number of references within the list is absent after the retrieving step and wherein the step of displaying the file comprises:
    displaying the first number of references in a first format; and
    displaying the second number of references in a second format, wherein references with data can be distinguished from references without data by the user.

15. The data processing system of claim 14, wherein the selected event is a period of time in which user input to the computer is absent.

16. The data processing system of claim 14, wherein the selected event is a time during which activity on the computer is lowest.

17. The data processing system of claim 14, wherein the distributed database is the Internet.

18. The data processing system of claim 14, wherein the file is a list of references.

19. A data processing system for browsing a distributed database comprising:
    allocation means for allocating storage in a computer for a file, wherein the file is used for storing references to a set of files in the distributed database for retrieval at a later time;
    adding means for adding a reference to a first file within the set of files in the distributed database to the file in which the reference is displayed on the computer within a second file in the distributed database in response to a user input, selecting the reference without the first file, from a user using the computer to browse the distributed database.

20. The data processing system of claim 19 further comprising:
    retrieving means for retrieving the set of files from the distributed database using references to the set of files stored within the file in response to a selected event, wherein the set of files is retrieved for viewing by the user at a later time.

21. The data processing system of claim 20 further comprising:
    storing means for storing the set of files locally within the computer, wherein the set of files is available when desired by the user.

22. The data processing system of claim 21 further comprising:
    displaying means for displaying the first file to the user in response to the user requesting the first file at the later time.

23. The data processing system of claim 22, wherein files referenced by a first number of references within the file is present and files referenced by a second number of references within the file is absent and wherein display means comprises:
    first presentation means for displaying the first number of references in a first format; and
    second presentation means for displaying the second number of references in a second format, wherein references with files can be distinguished from references without files by the user.

24. The data processing system of claim 22 further comprising:
    retrieval means for retrieving the first file for the reference from the distributed database in response to a selection of the reference from the second number of references.

25. The data processing system of claim 23 further comprising:
    retrieval means for retrieving the first file for the reference from the computer and displaying the first file in response to a selection of the reference from the first number of references.

26. A browser program in a computer readable medium used on a computer for browsing a distributed database, the browser program comprising:
    first instructions for displaying a document containing links, wherein each link represents a reference to a document on the distributed database;
    second instructions for storing a reference to a document in a file in response to a selection of a link associated with the document by the user; and
    third instructions for retrieving references in the file in response to a pre-selected event, wherein the data is retrieved for viewing by the user at a later time.

27. The browser program of claim 26 further comprising:

fourth instructions for displaying references stored within the file to the user in response to the user requesting the file at the later time.

28. The browser program of claim 27, wherein data for a first number of references with the list is present and data for a second number of references within the file is absent after the retrieving step and wherein the second display means comprises:

first presentation means for displaying the first number of references in a first format; and second presentation means for displaying the second number of references in a second format, wherein references with data can be distinguished from references without data by the user.

29. A computer program product in a computer readable medium for browsing a distributed database, the computer program product comprising:

first instructions for allocating storage in a computer for a file, wherein the file is used for storing references to a set of files in the distributed database for retrieval at a later time;

second instructions for adding a reference to a first file within the set of files in the distributed database to the file in which the reference is displayed on the computer within a second file in the distributed database in response to a user input, selecting the reference without retrieving the first file, from a user using the computer to browse the distributed database.

30. The computer program product of claim 29 further comprising:

third instructions for retrieving the set of files from the distributed database using references to the set of files stored within the file in response to a selected event, wherein the set of files is retrieved for viewing by the user at a later time.

31. The computer program product of claim 30 further comprising:

fourth instructions for storing the retrieved data locally within the computer, wherein the retrieved data is available when desired by the user.

32. The computer program product of claim 31 further comprising:

fifth instructions for displaying references stored within the file to the user in response to the user requesting the file.

33. The computer program product of claim 32, wherein data referenced by a first number of references within the file is present data referenced by a second number of references within the file is absent and wherein the fifth instructions comprises:

instructions for displaying the first number of references in a first format; and instructions for displaying the second number of references in a second format, wherein references with data can be distinguished from references without data by the user.

* * * * *

UNITED STATES PATENT AND TRADEMARK OFFICE
CERTIFICATE OF CORRECTION

PATENT NO. : 6,754,697 B1
APPLICATION NO. : 09/108148
DATED : June 22, 2004
INVENTOR(S) : Berstis It is certified that error appears in the above-identified patent and that said Letters Patent is hereby corrected as shown below:

Col. 8, line 53: after "files" insert --in the--.

Col. 8, line 64: after "using" delete "reference" and insert --references--.

Col. 9, line 15: after "wherein" delete "file reference" and insert --files referenced--.

Col. 9, line 17: before "by a" delete "reference" and insert --referenced--.

Col. 10, line 12: before "the first file," insert --retrieving--.

Col. 12, line 20: after "present" insert --and--.

Signed and Sealed this

Thirtieth Day of January, 2007

JON W. DUDAS
*Director of the United States Patent and Trademark Office*